(12) United States Patent
Merry et al.

(10) Patent No.: US 10,082,034 B2
(45) Date of Patent: Sep. 25, 2018

(54) ROTOR AND GAS TURBINE ENGINE INCLUDING SAME

(71) Applicant: United Technologies Corporation, Farmington, CT (US)

(72) Inventors: Brian D. Merry, Andover, CT (US); Gabriel L. Suciu, Glastonbury, CT (US); James D. Hill, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 581 days.

(21) Appl. No.: 14/755,952

(22) Filed: Jun. 30, 2015

(65) Prior Publication Data

US 2016/0003058 A1 Jan. 7, 2016

Related U.S. Application Data

(60) Provisional application No. 62/020,678, filed on Jul. 3, 2014.

(51) Int. Cl.
*F01D 5/34* (2006.01)
*F01D 5/22* (2006.01)
*F01D 5/02* (2006.01)

(52) U.S. Cl.
CPC .............. *F01D 5/225* (2013.01); *F01D 5/02* (2013.01); *F01D 5/34* (2013.01); *F05D 2220/32* (2013.01); *F05D 2240/24* (2013.01); *F05D 2260/941* (2013.01)

(58) Field of Classification Search
CPC ..................................... F01D 5/10; F01D 5/34
See application file for complete search history.

(56) References Cited

U.S. PATENT DOCUMENTS

| | | | | | |
|---|---|---|---|---|---|
| 2,957,675 | A | * | 10/1960 | Mason | F01D 5/10 416/193 A |
| 3,712,757 | A | * | 1/1973 | Goodwin | F01D 5/28 416/193 R |
| 4,802,824 | A | * | 2/1989 | Gastebois | F01D 5/282 416/193 A |
| 5,540,551 | A | * | 7/1996 | Heinig | F01D 5/22 416/190 |
| 7,097,422 | B2 | * | 8/2006 | Rice | B23H 9/10 415/134 |
| 7,887,299 | B2 | * | 2/2011 | Xiao | F01D 5/10 416/203 |
| 2008/0089788 | A1 | * | 4/2008 | Loehle | F01D 5/22 416/191 |
| 2013/0108445 | A1 | | 5/2013 | Suciu et al. | |

* cited by examiner

*Primary Examiner* — Woody Lee, Jr.
(74) *Attorney, Agent, or Firm* — Cantor Colburn LLP

(57) ABSTRACT

A rotor for a gas turbine engine includes a plurality of blades which extend from a rotor disk, adjacent ones of the plurality of blades are joined by a flexible web.

20 Claims, 5 Drawing Sheets

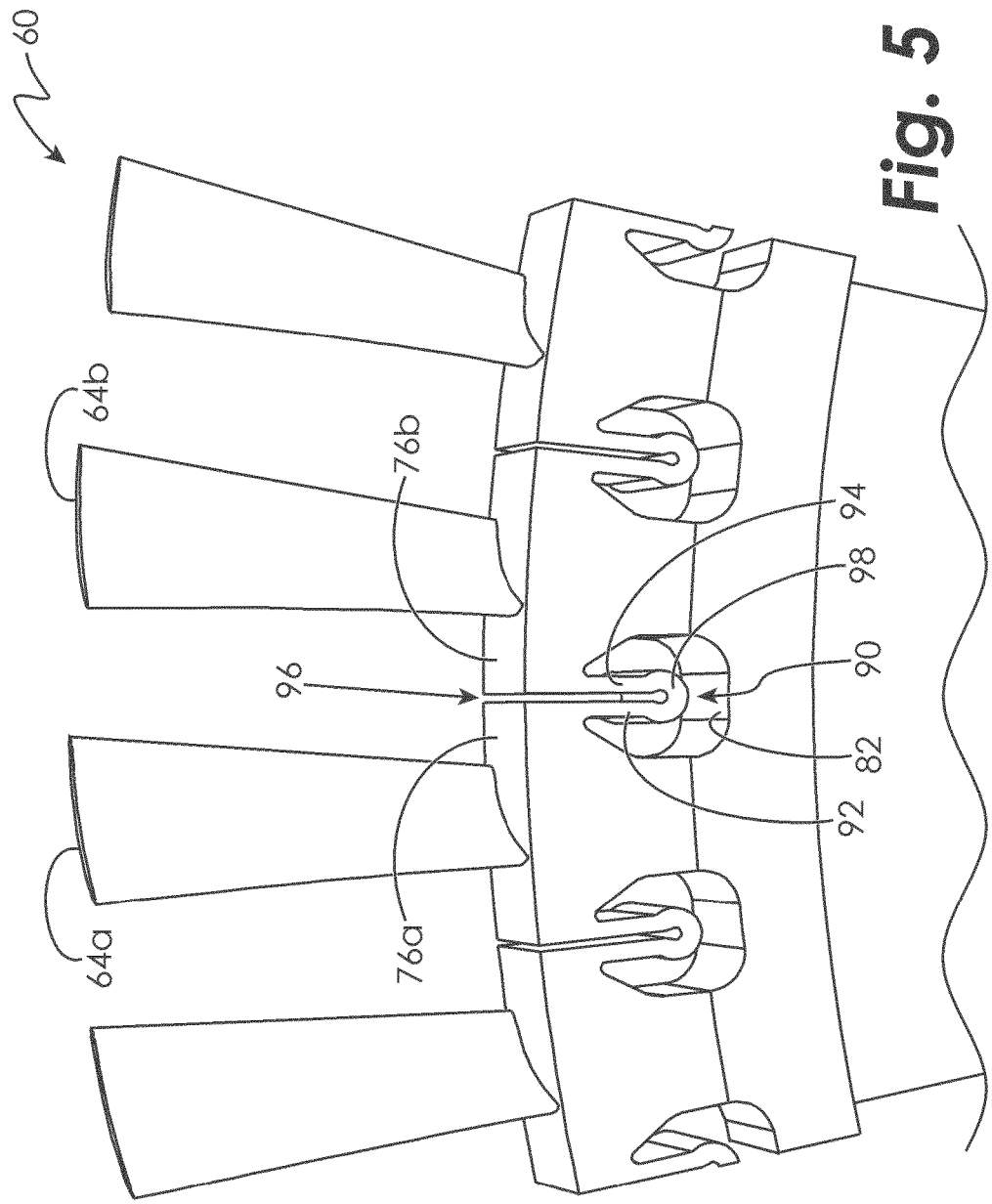

US 10,082,034 B2

ROTOR AND GAS TURBINE ENGINE INCLUDING SAME

CROSS REFERENCE TO RELATED APPLICATION

This application claims the benefit of and incorporates by reference herein the disclosure of U.S. Ser. No. 62/020,678, filed Jul. 3, 2014.

TECHNICAL FIELD OF THE DISCLOSURE

The present disclosure relates generally to a gas turbine engine, and more specifically to a rotor for a gas turbine engine.

BACKGROUND OF THE DISCLOSURE

Gas turbine rotor systems include successive rows of blades, which extend from respective rotor disks that are arranged in an axially stacked configuration. The rotor stack may be assembled through a multitude of systems such as fasteners, fusion, tie-shafts and combinations thereof.

Gas turbine rotor systems operate in an environment in which significant pressure and temperature differentials exist across component boundaries which primarily separate a core gas flow path and a secondary cooling flow path. For high-pressure, high-temperature applications, the components experience thermo-mechanical fatigue (TMF) across these boundaries. Although resistant to the effects of TMF, the components may be of a heavier-than-optimal weight for desired performance requirements.

SUMMARY OF THE DISCLOSURE

In one embodiment, a rotor for a gas turbine engine is disclosed comprising: a rotor disk defined along an axis of rotation; and a plurality of blades which extend from said rotor disk; and a plurality of flexible webs, each of said plurality of flexible webs joining two of said plurality of blades.

In a further embodiment of the above, each of said plurality of flexible webs comprises: a first arm including a first arm proximal end operatively coupled to a first one of the plurality of blades, the first arm further including a first arm distal end; and a second arm including a second arm proximal end operatively coupled to a second one of the plurality of blades, the second arm further including a second arm distal end operatively coupled to the first arm distal end.

In a further embodiment of any of the above, further comprising a radiused joint operatively coupling the first arm distal end to the second arm distal end.

In a further embodiment of any of the above, the first arm and the second arm each extend radially inboard.

In a further embodiment of any of the above, each of said plurality of blades includes a platform section.

In a further embodiment of any of the above, each of said plurality of flexible webs comprises: a first arm including a first arm proximal end operatively coupled to a first platform section of a first one of the plurality of blades, the first arm further including a first arm distal end; and a second arm including a second arm proximal end operatively coupled to a second platform section of a second one of the plurality of blades, the second arm further including a second arm distal end operatively coupled to the first arm distal end.

In a further embodiment of any of the above, further comprising a radiused joint operatively coupling the first arm distal end to the second arm distal end.

In a further embodiment of any of the above, the first arm and the second arm each extend radially inboard.

In a further embodiment of any of the above, said rotor disk is manufactured of a first material and said plurality of blades are manufactured of a second material, said first material different than said second material.

In a further embodiment of any of the above, said plurality of blades are high pressure compressor blades.

In a further embodiment of any of the above, said rotor disk and said plurality of blades comprise an integrally bladed rotor.

In another embodiment, a spool for a gas turbine engine is disclosed comprising: a compressor rotor disk defined along an axis of rotation; and a plurality of compressor blades which extend from said compressor rotor disk; and a first plurality of flexible webs, each of said first plurality of flexible webs joining two of said plurality of compressor blades.

In a further embodiment of the above, each of said first plurality of flexible webs comprises: a first arm including a first arm proximal end operatively coupled to a first one of the plurality of compressor blades, the first arm further including a first arm distal end; and a second arm including a second arm proximal end operatively coupled to a second one of the plurality of compressor blades, the second arm further including a second arm distal end operatively coupled to the first arm distal end.

In a further embodiment of any of the above, further comprising a radiused joint operatively coupling the first arm distal end to the second arm distal end.

In a further embodiment of any of the above, the first arm and the second arm each extend radially inboard.

In a further embodiment of any of the above, each of said plurality of compressor blades includes a platform section, the first arm proximal end operatively coupled to a first platform section of the first one of the plurality of compressor blades, and the second arm proximal end operatively coupled to a second platform section of the second one of the plurality of compressor blades.

In a further embodiment of any of the above, said compressor rotor disk is manufactured of a first material and said plurality of compressor blades are manufactured of a second material, said first material different than said second material.

In a further embodiment of any of the above, said plurality of compressor blades are high pressure compressor blades.

In a further embodiment of any of the above, said compressor rotor disk and said plurality of compressor blades comprise an integrally bladed rotor.

In a further embodiment of any of the above, further comprising: a turbine rotor disk defined along said axis of rotation; and a plurality of turbine blades which extend from said turbine rotor disk; and a second plurality of flexible webs, each of said second plurality of flexible webs joining two of said plurality of turbine blades.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 5 is a partial perspective view of a rotor in an embodiment.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
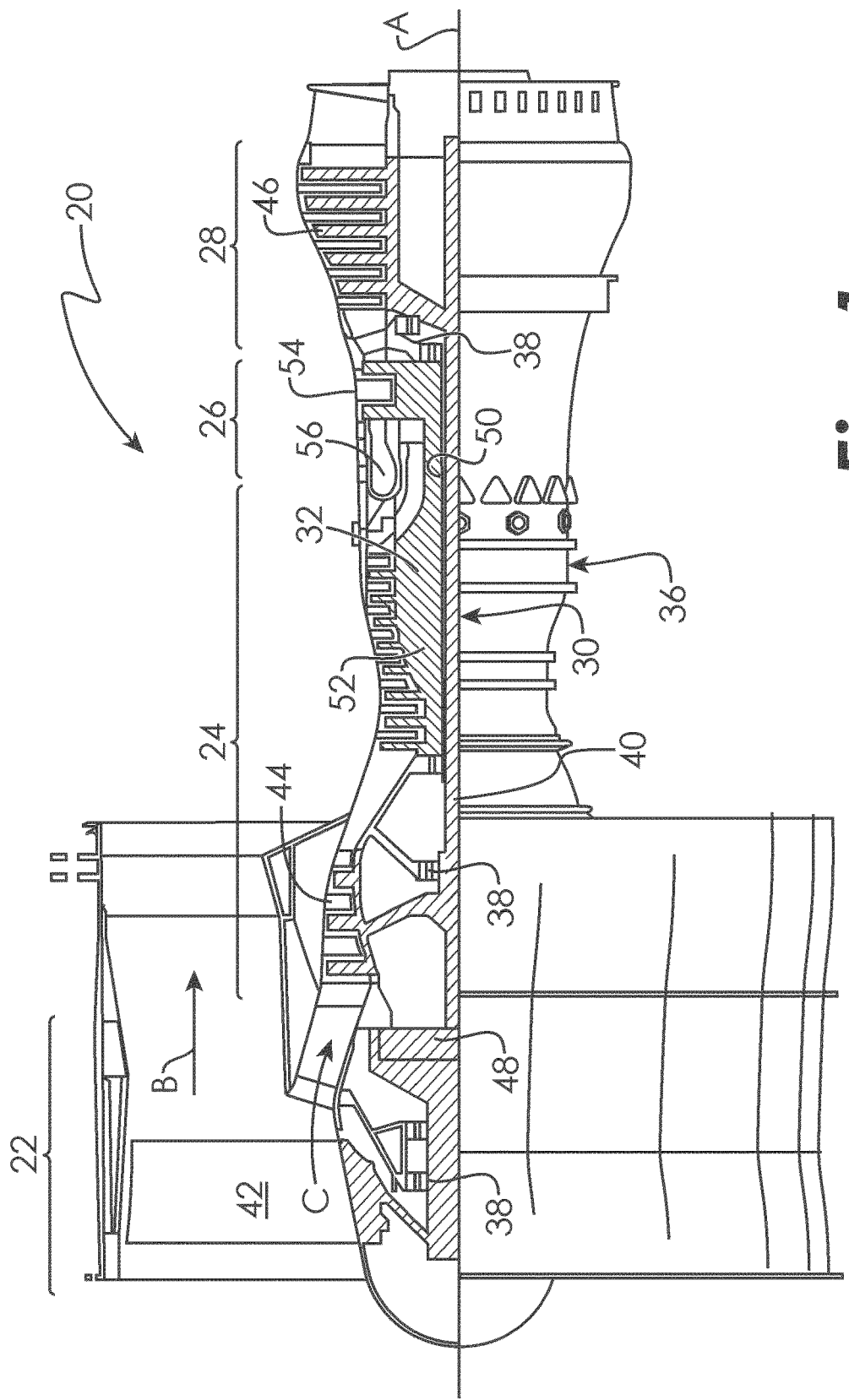
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
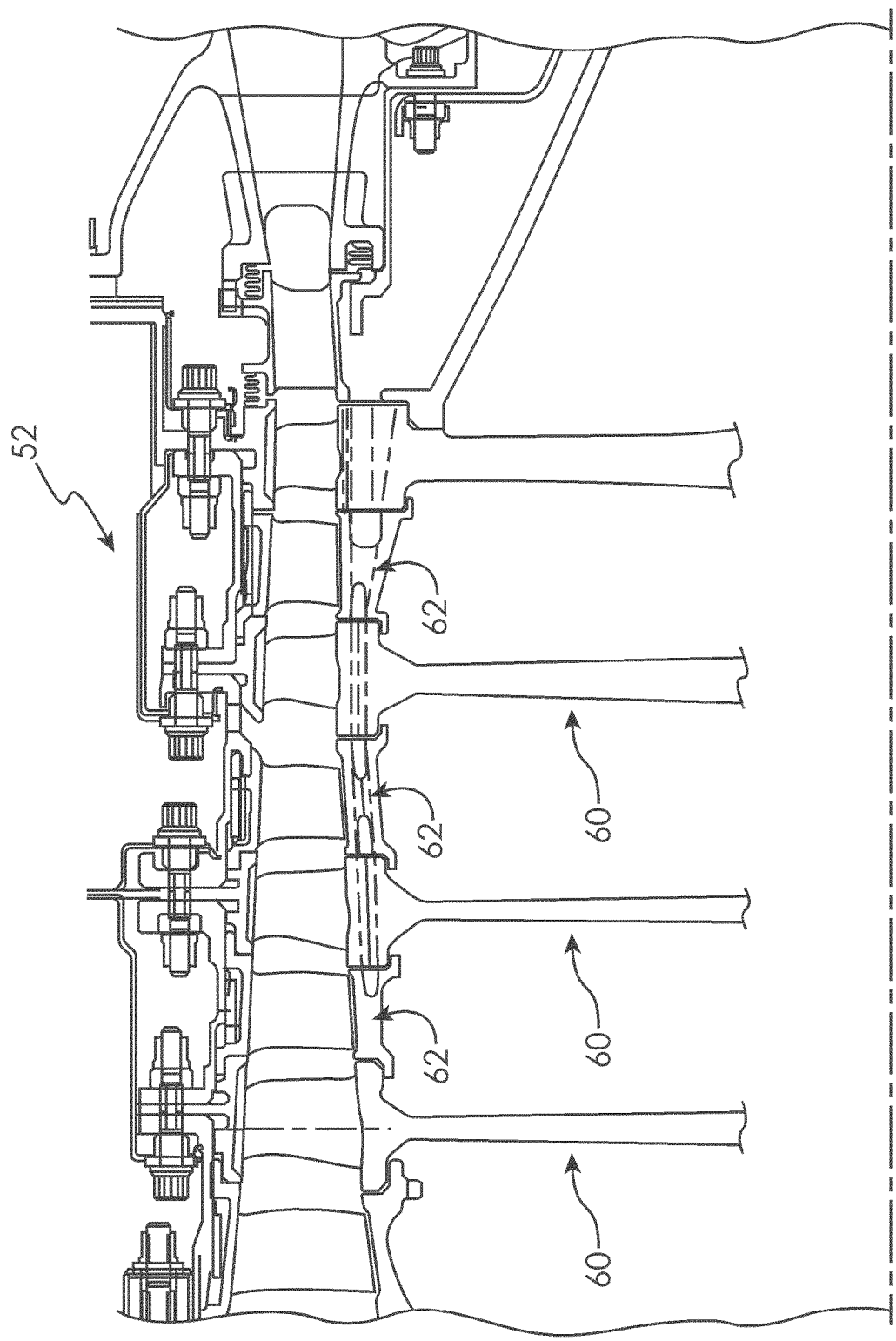
FIG. 2 is an enlarged schematic cross-sectional view of a high pressure compressor section of the gas turbine engine.

With reference to FIG. 2, the high pressure compressor (HPC) 52 is assembled from a plurality of successive HPC rotors 60 which alternate with HPC spacers 62 arranged in a stacked configuration. The rotor stack may be assembled in a compressed tie-shaft configuration, in which a central shaft (not shown) is assembled concentrically within the rotor stack and secured with a nut (not shown), to generate a preload that compresses and retains the HPC rotors 60 with the HPC spacers 62 together as a spool. Friction at the interfaces between the HPC rotor 60 and the HPC spacers 62 is solely responsible to prevent rotation between adjacent rotor hardware.

Figure 3:
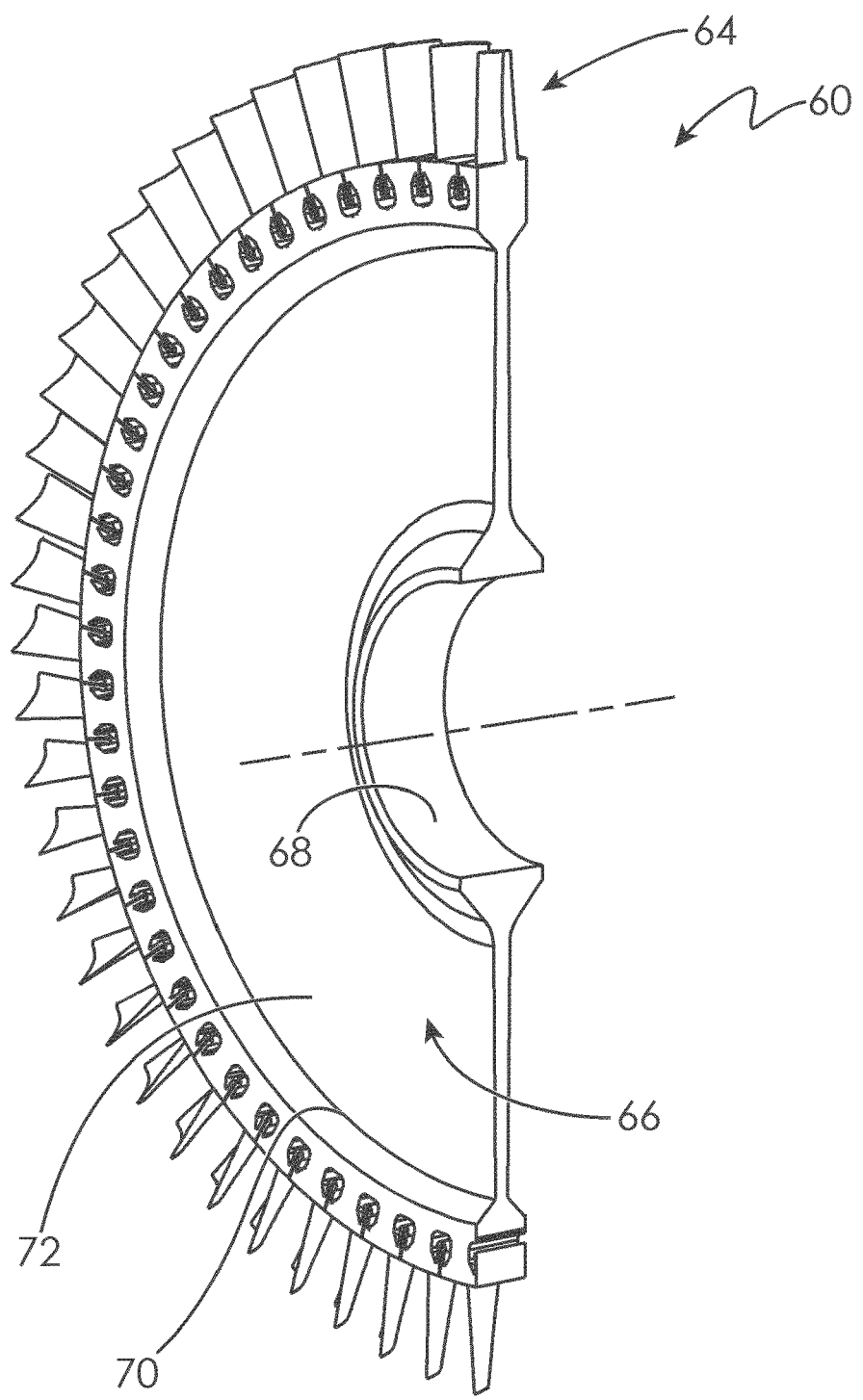
FIG. 3 is a cross-sectional perspective view of a rotor of the high pressure compressor section.

With reference to FIG. 3, each HPC rotor 60 generally includes a plurality of blades 64 circumferentially disposed around a rotor disk 66. The rotor disk 66 generally includes a hub 68, a rim 70, and a web 72 which extends therebetween. Each blade 64 generally includes an attachment section 74, a platform section 76 and an airfoil section 78 (FIG. 4).

The HPC rotor 60 may be a hybrid dual alloy integrally bladed rotor (IBR) in which the blades 64 are manufactured of one type of material and the rotor disk 66 is manufactured of different material. Bi-metal construction provides material capability to separately address different temperature requirements. For example, the blades 64 may be manufactured of a single crystal nickel alloy that are partial transient liquid phase bonded with the rotor disk 66 which is manufactured of a different material such as an extruded billet nickel alloy. It will be appreciated that the blades 64 may be joined to the rotor disk 66 in other ways, such as joined using linear friction welding or printed on to the rotor disk 66 using an additive manufacturing technique, to name just two non-limiting examples. Alternatively, or in addition to the different materials, the blades 64 may be subject to a first type of heat treat and the rotor disk 66 to a different heat treat. That is, the bi-metal construction as defined herein includes different chemical compositions as well as different treatments of the same chemical compositions such as that provided by differential heat treatment.

Figure 4:
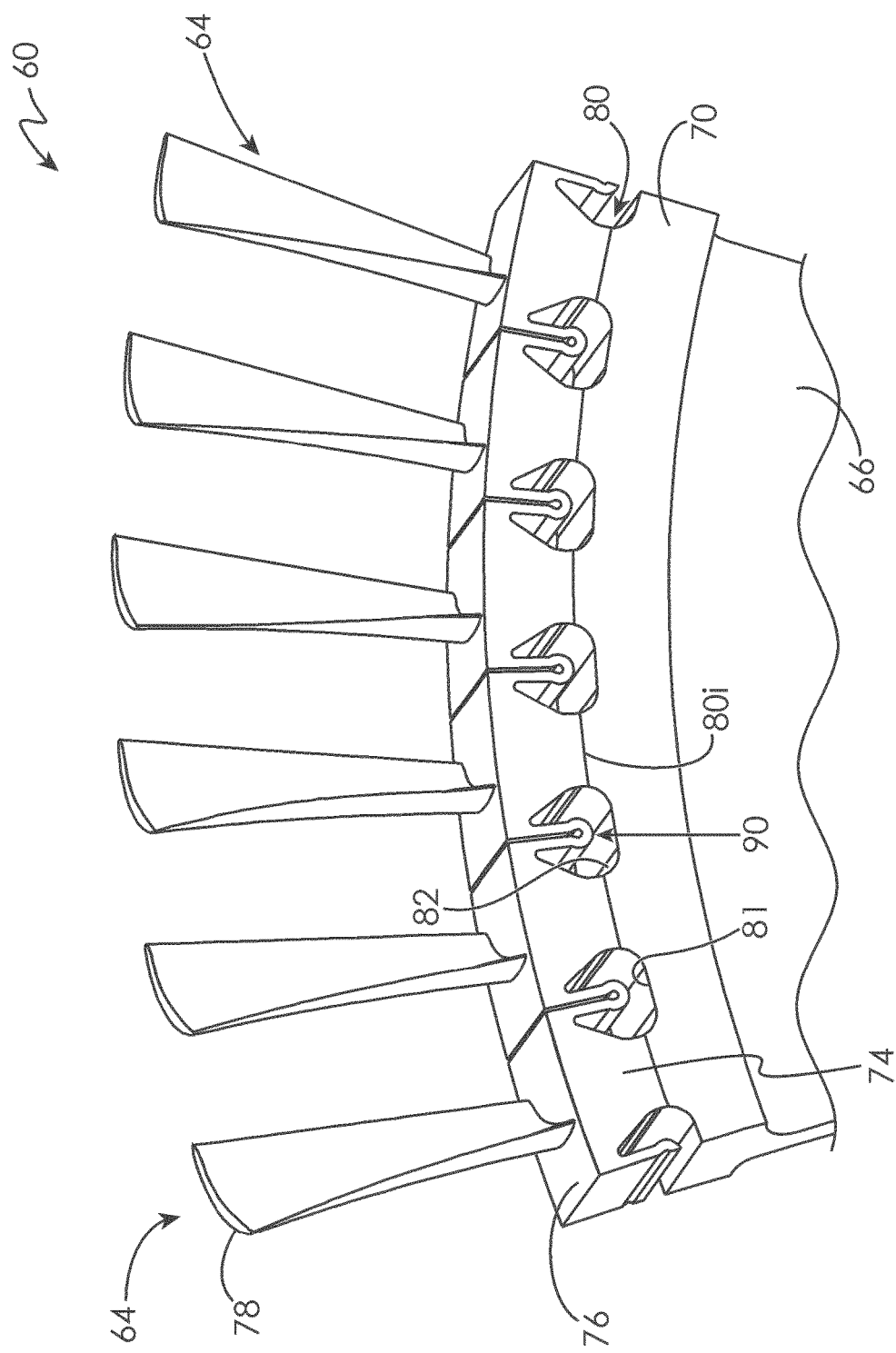
FIG. 4 is a partial perspective view of a rotor in an embodiment.

With reference to FIG. 4, a spoke 80 is defined between the rim 70 and the platform section 76. The spoke 80 is a circumferentially reduced section defined by interruptions which produce axial or semi-axial slots 81 which flank each spoke 80. The spokes 80 and slots 81 may be machined, cut with a wire EDM or other processes to provide the desired shape. An interface 80i that defines the partial transient liquid phase bond and or heat treat transition between the blades 64 and the rotor disk 66 are defined within the spoke 80. That is, the spoke 80 contains the interface 80i. Heat treat transition as defined herein is the transition between differential heat treatments.

The spoke 80 provides a reduced area subject to the thermo-mechanical fatigue (TMF) across the relatively high temperature gradient between the blades 64 which are within the relatively hot core gas path and the rotor disk 66 which is separated therefrom and is typically cooled with a secondary cooling airflow. The rotor geometry provided by the spokes 80 reduces the transmission of core gas path temperature via conduction to the rotor disk 66. The spokes 80 enable an IBR rotor to withstand increased T3 levels with currently available materials. Additionally, adjacent spokes 80 and slots 81 define passages 82 through which cooling airflow may be routed if the space between adjacent blades 64 is sealed. Prior designs utilize a wire seal or feather seal in an attempt to isolate the hot core gas path air from cooling airflow carried within the passages 82. However, such seals have a leakage rate that allows high temperature, high pressure gas path air to leak into the cooling passages 82, degrading their cooling effectiveness.

With reference to FIGS. 4 and 5, the presently disclosed embodiments utilize blades 64 formed as a full hoop component of the rotor 60. The platform sections 76 of adjacent blades 64 are spaced apart and are joined by flexible webs 90. Each flexible web 90 comprises a first arm 92 including a first arm proximal end coupled to the platform section 76a of a first blade 64a, and a second arm 94 including a second arm proximal end coupled to the platform section 76b of a second blade 64b adjacent the first blade 64a. In one embodiment, the first arm 92 and the second arm 94 extend radially inboard from respective platform sections 76a and 76b. A first arm 92 distal end is operatively coupled to a second arm 94 distal end, thereby defining a gap 96 between the first arm 92 and the second arm 94. In the illustrated embodiment, the distal ends of first arm 92 and second arm 94 are joined by a radiused joint 98. The flexible web 90 may be formed in any shape as long as the flexible web 90 exhibits the ability to maintain its integrity through the full range of expected relative movement between the adjacent blades 64a and 64b. The flexible webs 90 may be machined, cut with a wire EDM or other processes to provide the desired shape.

The flexible web 90 allows relative movement of the blades 64a and 64b, thereby reducing thermo-mechanical fatigue within the rotor 60 as it is exposed to temperature transitions. The flexible webs 90 also effectively seal the passages 82, thereby significantly reducing the amount of hot core gas path air that is able to mix with the cooling airflow within the passages 82. While the rotor 60 has been exemplarily described herein for use with a high pressure compressor, it will be appreciated that the structures and concepts disclosed herein may be used with a rotor for any type of turbomachinery, such as a turbine rotor disk to name just one non-limiting example.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A rotor for a gas turbine engine comprising:
   a rotor disk defined along an axis of rotation;
   a plurality of cooling airflow passages extending axially through the rotor disk;
   a plurality of blades integrally formed with and extending from said rotor disk; and
   a plurality of flexible webs integrally formed with the rotor disk, each of said plurality of flexible webs extending between two of said plurality of blades, wherein the plurality of flexible webs provide a seal to the plurality of cooling airflow passages.

2. The rotor of claim 1, wherein each of said plurality of flexible webs comprises:
   a first arm including a first arm proximal end operatively coupled to a first one of the plurality of blades, the first arm further including a first arm distal end; and
   a second arm including a second arm proximal end operatively coupled to a second one of the plurality of blades, the second arm further including a second arm distal end operatively coupled to the first arm distal end.

3. The rotor of claim 2, further comprising a radiused joint operatively coupling the first arm distal end to the second arm distal end.

4. The rotor of claim 2, wherein the first arm and the second arm each extend radially inboard.

5. The rotor of claim 1, wherein each of said plurality of blades includes a platform section.

6. The rotor of claim 5, wherein each of said plurality of flexible webs comprises:

a first arm including a first arm proximal end operatively coupled to a first platform section of a first one of the plurality of blades, the first arm further including a first arm distal end; and a second arm including a second arm proximal end operatively coupled to a second platform section of a second one of the plurality of blades, the second arm further including a second arm distal end operatively coupled to the first arm distal end.

7. The rotor of claim 6, further comprising a radiused joint operatively coupling the first arm distal end to the second arm distal end.

8. The rotor of claim 6, wherein the first arm and the second arm each extend radially inboard.

9. The rotor of claim 1, wherein said rotor disk is manufactured of a first material and said plurality of blades are manufactured of a second material, said first material different than said second material.

10. The rotor of claim 1, wherein said plurality of blades are high pressure compressor blades.

11. The rotor of claim 1, wherein said rotor disk and said plurality of blades comprise an integrally bladed rotor.

12. A spool for a gas turbine engine comprising:
a compressor rotor disk defined along an axis of rotation;
a plurality of cooling airflow passages extending axially through the compressor rotor disk;
a plurality of compressor blades integrally formed with and extending from said compressor rotor disk; and
a first plurality of flexible webs integrally formed with the rotor disk, each of said first plurality of flexible webs extending between two of said plurality of compressor blades, wherein the first plurality of flexible webs provide a seal to the plurality of cooling airflow passages.

13. The spool of claim 12, wherein each of said first plurality of flexible webs comprises:
a first arm including a first arm proximal end operatively coupled to a first one of the plurality of compressor blades, the first arm further including a first arm distal end; and a second arm including a second arm proximal end operatively coupled to a second one of the plurality of compressor blades, the second arm further including a second arm distal end operatively coupled to the first arm distal end.

14. The spool of claim 13, further comprising a radiused joint operatively coupling the first arm distal end to the second arm distal end.

15. The spool of claim 13, wherein the first arm and the second arm each extend radially inboard.

16. The spool of claim 13, wherein each of said plurality of compressor blades includes a platform section, the first arm proximal end operatively coupled to a first platform section of the first one of the plurality of compressor blades, and the second arm proximal end operatively coupled to a second platform section of the second one of the plurality of compressor blades.

17. The spool of claim 12, wherein said compressor rotor disk is manufactured of a first material and said plurality of compressor blades are manufactured of a second material, said first material different than said second material.

18. The spool of claim 12, wherein said plurality of compressor blades are high pressure compressor blades.

19. The spool of claim 12, wherein said compressor rotor disk and said plurality of compressor blades comprise an integrally bladed rotor.

20. The spool of claim 12, further comprising:
a turbine rotor disk defined along said axis of rotation;
a plurality of cooling airflow passages extending axially through the turbine rotor disk; and
a plurality of turbine blades integrally formed with and extending from said turbine rotor disk; and
a second plurality of flexible webs integrally formed with the turbine rotor disk, each of said second plurality of flexible webs extending between two of said plurality of turbine blades, wherein the second plurality of flexible webs provide a seal to the plurality of cooling airflow passages of the turbine rotor disk.

* * * * *